March 10, 1964  J. D. FACKLER ETAL  3,124,761
GATING CIRCUIT
Filed April 27, 1961  3 Sheets-Sheet 1

INVENTOR.
JOHN D. FACKLER
CHARLES R. KENNY
BY H. S. Mackay
ATTORNEY.

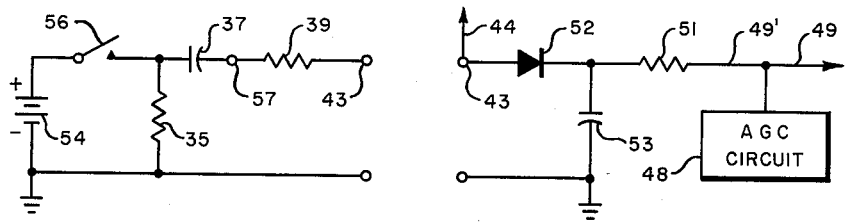
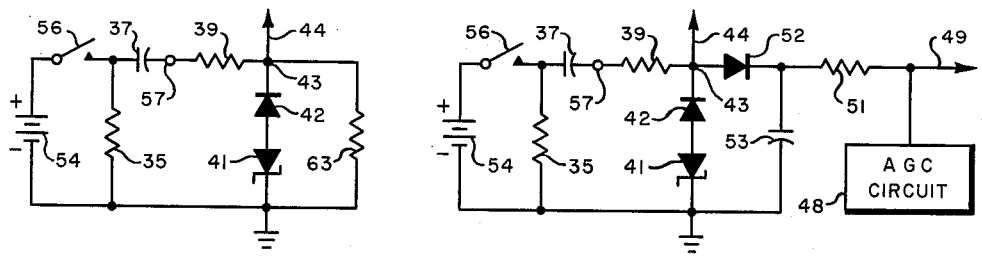
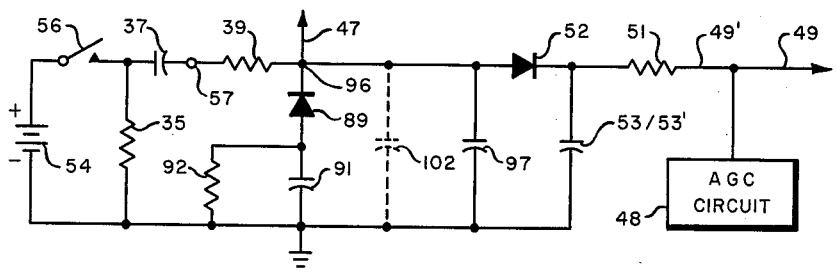

United States Patent Office 3,124,761
Patented Mar. 10, 1964

3,124,761
GATING CIRCUIT
John D. Fackler, Bedford, and Charles R. Kenny, Purdy's Station, N.Y., assignors to General Precision, Inc., a corporation of Delaware
Filed Apr. 27, 1961, Ser. No. 105,945
6 Claims. (Cl. 330—51)

This invention relates to gating circuits and more particularly to such circuits as used in connection with pulse Doppler receivers.

Pulse Doppler radar receivers must be desensitized during the transmitting pulse, and should be instantly restored to sensitivity upon the termination of the transmitting pulse. However, instant restoration, that is, restoration of full receiver sensitivity withi a small fraction of a microsecond, is difficult because the pulse waveform is not strictly rectangular, but has a sloping and somewhat curved trailing edge, and also because of the use of automatic gain control in such circuits. A contributing factor is leakage of transmitter power into the receiver due to such things as high voltage standing wave ratios in the transmitter microwave circuits, causing excitation of the automatic gain control. In the case of Doppler radar navigational systems for aircraft, any delay in restoring sensitivity to the receiver degrades the lower altitude limit of operation of the system by about five hundred feet for each microsecond of delay in restoration of sensitivity.

The present invention provides a gating circuit for a receiver amplifier which includes a connection to the automatic gain control circuit. This connection is so arranged that the width of the gating waveform at the level of the amplifier cutoff voltage remains constant or increases by a slight and controlled amount as the gain control voltage increases.

The principal object of this invention is to provide a gating circuit producing a gating pulse which has a substantially constant width for all values of the automatic gain control bus potential.

Another object is to provide a gating circuit for use in a Doppler pulse radar including a connection to the automatic gain control circuit.

Another object is to provide a gating circuit pulse having a width at receiver cutoff level which increases by a slight and controlled amount in proportion to the automatic gain control bias potential.

A further understanding of this invention may be secured from the detailed description and associated drawings, in which:

FIGURES 3, 4, 5, 6 and 8 are equivalent circuits employed in describing the operation of the invention.

Figure 1:
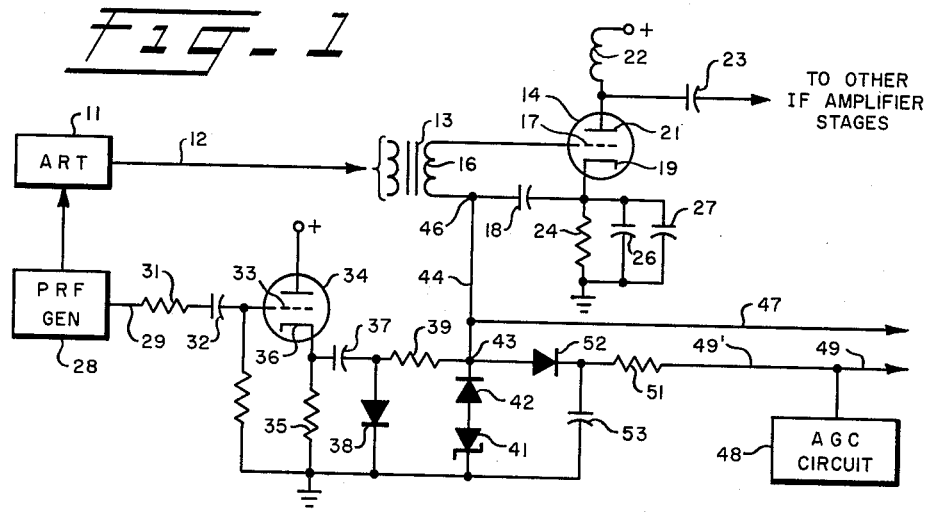
FIGURE 1 is a schematic diagram of an embodiment of the invention.

Referring now to FIGURE 1, an antenna-receiver-transmitter 11 for a pulsed Doppler air navigation radar system emits an output containing Doppler information on conductor 12 at a carrier frequency of 30 mcps. This output is applied through an input transformer 13 to a tube 14 comprising the first triode stage of an intermediate frequency amplifier. The transformer secondary winding 16 is connected at one end to the control grid 17 and is coupled at the other end, through a 100 μμf. capacitor 18, to the cathode 19. The anode 21 is connected to a source of positive potential through an inductor 22. Output is coupled from the anode 21 through a .0047 μfd. capacitor 23. The first intermediate frequency stage is shown as a triode, but it is understood that those skilled in the art can readily substitute another type of amplifier stage such as, for example, the cascode stage depicted in FIGURE 7.

The cathode 19 is grounded through a 91-ohm resistor 24 which is shunted by two capacitors, 26 and 27. Capacitor 26 has a capacitance of .0047 μfd. to bypass 30-mc.p.s. energy. Capacitor 27 has a capacitance of 4.7 μfd. and has the function of holding the potential of the cathode 19 substantially constant during the 19 microseconds between gating pulses, since its time constant in association with resistor 24 is about 500 μsec. In the absence of this capacitor, after each gating pulse the recovery of the cathode to its operating potential would be accompanied by increased plate-cathode current. This would increase tube noise and degrade the effective signal-to-noise ratio of the receiver.

The transmitter portion of the antenna-transmitter-receiver 11 is pulsed with one-microsecond pulses at a rate of 50 kc.p.s. by a generator 28. This generator also emits negative 1 μsec. pulses on conductor 29 having the same frequency and phase as the pulses applied to the transmitter. These pulses are ideally rectangular, but in practice always have a trapezoidal form except that the sides are slightly curved, as shown in Curve A of FIGURE 2.

The gate pulse on conductor 29 is applied through a protective resistor 31 and capacitor 32 to the control grid 33 of a triode tube 34 connected as a cathode follower, with cathode resistor 35. Output is taken from the cathode 36 through a capacitor 37. The output of capacitor 37, if unloaded, would consist of a waveform having equal areas above and below an average potential, for example, ground potential. The peak-to-peak potential of the capacitor output is 15 volts. The capacitor is followed by a diode 38 acting as a restorer, limiting the upper potential to approximately that of ground. This diode, however, normally plays no part in the functioning of the circuit, but merely serves as a safeguard to prevent the potential on the load side of the capacitor 37 from rising appreciably above ground in the event that the automatic gain control bus becomes positive.

The diode 38 is followed by a resistor 39, terminal 43 of which is connected to ground through a 10-volt Zener diode 41 in series with a diode 42. The purpose of this pair of diodes is to limit the negative potential at junction 43 to about −10 volts. Zener diodes generally have large internal capacitance and therefore will not respond rapidly to sharp pulses. In such cases, as here, it is necessary to supplement the Zener diode 41 with an ordinarly diode 42 having good pulse characteristics so that upon reduction of the potential of junction 43 to less than −10 volts relative to ground, the current through the branch will stop immediately. Thus the Zener diode current will be shut off without delay at the trailing edge of the gate pulse.

Negative pulses at junction 43 are employed to gate off the intermediate frequency amplifier during transmitter pulses by biasing the first and second amplifier stages to beyond cutoff for the duration of each pulse, and to restore the amplifier sensitivity as quickly as possible after each pulse under all conditions.

To accomplish this, the junction 43 is connected through conductor 44 to the lower or cathode end 46 of the input transformer secondary winding 16. This connection thus constitutes the direct-current grid return of the first intermediate amplifier stage. Second stage biasing is secured through conductor 47 and its circuit is identical with that for the first stage.

An automatic gain control circuit 48 is connected conventionally to control, through conductor 49, the gains of all intermediate amplifier stages after the first two. The AGC circuit is additionally connected through conductor 49′, a resistor 51 and diode 52 to the junction 43 to gain-control the first two stages and also for purposes associated with this invention. The junction of resistor 51 and diode 52 is coupled to ground through a capacitor 53 to smooth the gain control potential and to reduce effects of the gating potential on the AGC system.

In analyzing the action of this circuit an equivalent circuit, FIGURE 3, is drawn to simulate the action of the PRF generator 28, cathode follower 34, cathode resistor 35, capacitor 37 and resistor 39. A +15-volt battery 54, connected in series with a switch 56 which is assumed to close periodically for 19 μs. then to open for 1 μs., represents the generator. The resistor 35 simulates the output impedance of the cathode follower. The diode 38, FIGURE 1, is omitted since it has merely a precautionary function. If the output terminals, 43 and ground, be connected by a resistor, it is evident that, during the pulsing cycles, the right terminal 57 of the capacitor 37 will alternately charge and discharge by induction, with current flowing into and out of the capacitor through the load resistor and that these inflowing and outflowing charge quantities must be equal. In FIGURE 2B, representing the potential at terminal 57, the average voltage is that of ground. Since the charge and discharge quantities of electricity into and out of the capacitor plate terminal 57 are equal, the area 58 of FIGURE 2B, representing charge current multiplied by time, must equal the area 59 representing discharge current multiplied by time.

If, in FIGURE 1, the Zener diode 41 and associated diode 42 were omitted, the load circuit would be as shown in FIGURE 4 taken together with FIGURE 3, and would be similar to prior art circuits for superimposing a blocking gate pulse on a negative automatic gain control potential.

In the operation of this circuit, assuming an AGC potential, $E_a$, of —1½ volt, during the increase of potential of the input side of capacitor 37, the potential of terminal 57 tends to increase, but its charge flows through diode 52 into the AGC system so long as its potential is above $E_a$. During the pulse, when switch 56, FIGURE 3, is open, the charge cannot flow back into capacitor 37 because of diode 52. Therefore the AGC system including diode 52 limits the positive-going limit of the pulse and the voltage between pulses to the negative voltage $E_a$. After an equalizing cycle or so there is no flow of charge either into or out of the terminal 57 and the situation is shown by the graph FIGURE 2C. That is, as the AGC negative potential is increased the pulse waveform is successively lowered. At any voltage referred to ground, such as the cutoff voltage 61 of the first intermediate amplifier stage, the pulse width, $x$, FIGURE 2C, becomes greater with increased $E_a$ and a lowered pulse waveform. Thus the point 62 at which restoration of amplifier operation is commenced is progressively retarded in time as the negative gain control voltage is increased. This is the deleterious effect which the present invention prevents.

The automatic gain control circuit operates on the normally-received signal to keep the intermediate amplifier output constant at all levels of received signal amplitude. Thus, as the airplane approaches the earth, strong main lobe signal returns and also very strong side lobe returns cause the automatic gain control to operate fully or nearly so. A number of other signal sources, however, operate the AGC circuit to some extent such as, for example, transmitter leakage and reflections at discontinuities in the microwave frequency circuits. Thus the deleterious effect of the prior circuits occurs at all altitudes, but particularly at the lowest altitudes, and has constituted a serious barrier to the operation of such systems below an altitude of several hundred feet.

The inventive circuit of FIGURE 1 prevents the lag in restoring the amplifier by adding the Zener diode 41 and associated diode 42. As an aid to understanding its effect, assume the load circuit of FIGURE 5, drawn in combination with the equivalent PRF circuit of FIGURE 3, employing a high resistance load resistor 63. When switch 56 is closed, between pulses, the capacitor 37 charges by induction. During pulses the charge potential drops to —10 volts, then current passes to terminal 57 through the Zener diode 41 from ground to keep the potential of terminal 57 at —10 volts. During the between-pulse time the pulse rises 15 volts to +5 volts. After equalization, as shown in FIGURE 2D, the waveform has been lifted, unchanged, with its negative peak at the Zener breakdown voltage of —10 volts. The pulse width at the cutoff voltage, 61, will have been considerably narrowed.

In combining the AGC FIGURE 2C of precedent art and the Zener action of FIGURE 2D it might be expected that, since one raises the waveform, narrowing the pulse at cutoff, and the other lowers the waveform, widening the pulse, by a proper choice of components, the two systems introduced into a single circuit could be expected to neutralize each other to produce a gate waveform having a width at amplifier cutoff which does not change at all with varying AGC voltage. This is actually what happens, but the mechanism is somewhat more complicated that that of a simple addition of the component mechanisms.

Referring to FIGURE 6 and to the graph of FIGURE 2E, during switch closure, between pulses, the capacitor terminal 57 is raised in potential by induction, but above the potential $E_a$ its potential produces current flowing through diode 52 into the AGC system, including capacitor 53. This current flow is indicated in FIGURE 2E by the area 58. During the pulse, as the potential of terminal 57 is lowered by electrostaic induction, below the potential $E_a$ and above the potential of —10 volts no current flow can occur into or out of the output side of capacitor 37 because no conductive path exists. At —10 volts, however, the Zener diode 41 becomes conductive and current flows from ground through it to the capacitor 37. This is schematically indicated in FIGURE 2E by the area 59. Since charge quantities into and out of a capacitor must be equal, the charge quantities represented by the areas 58 and 59 must be equal. By proper choice of components the width $x$ of the waveform at the amplifier cutoff voltage can be kept substantially constant with increasing $E_a$. Specifically, by controlling the respective current flows by controlling the reistances of resistors 39 and 51, and the capacitances of capacitors 37 and 53, the portion of the waveform of FIGURE 2A included in FIGURE 2E between $E_a$ and —10 volts can be varied at will, in turn greatly varying the width $x$.

This means that the lower altitude limit of operation of the system need not be degraded by action of the automatic gain control. In practice this improvement, when employed in conjunction with improvements in the transmitter which are outside of the scope of this invention, have permitted operation of the system very nearly and in some cases quite to zero or ground altitude.

It has been found that operation is improved if the peak potential of the gating pulse is not tightly clamped but is allowed to increase by a slight and controlled amount with increasing AGC potential. This permits tighter control of receiver gating to overcome deleterious effects consequent on increased AGC potential. These effects may include a regenerative narrowing of the amplifier bandwidth with reduced sensitivity or possibly complete blocking of signals.

Figure 7:
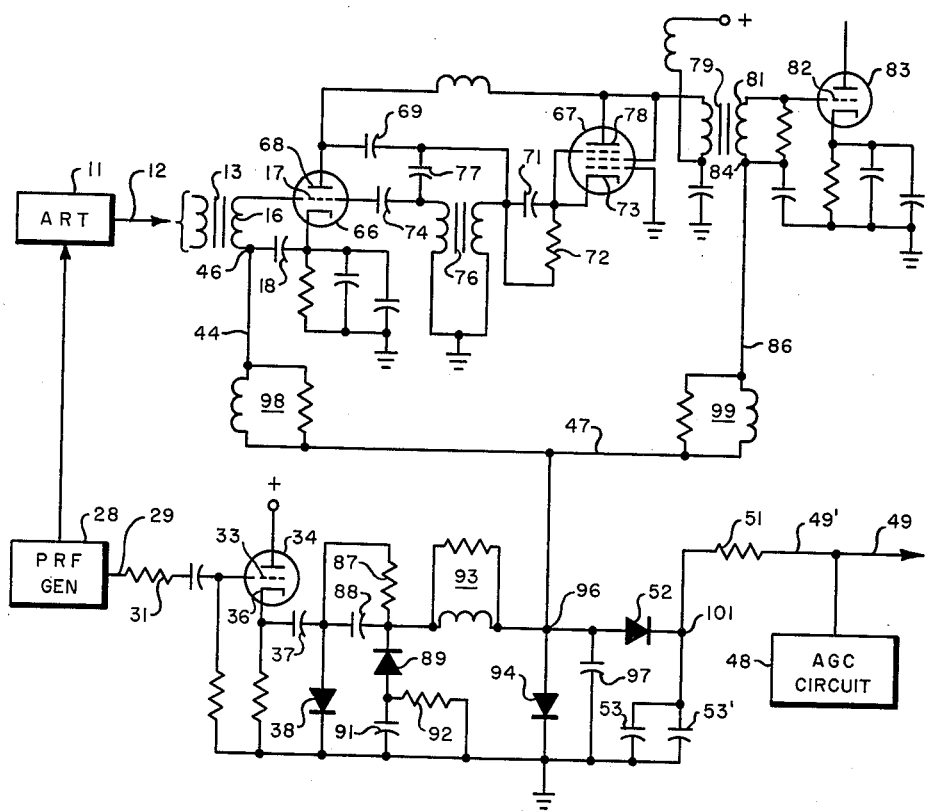
FIGURE 7 is a schematic diagram of a second embodiment of the invention.

A circuit for such operation is shown in FIGURE 7. The receiver signal is applied on conductor 12 to the input transformer 13 of the first intermediate frequency amplifier stage. This stage includes triode 66 and pentode 67 in a circuit commonly termed the grounded cathode grounded grid configuration. The triode anode 68 is coupled through capacitors 69 and 71 and resistor 72 to the cathode 73 of pentode 67. The internal capacitance of triode 66 is neutralized by a capacitance 74 with the assistance of transformer 76 and capacitor 77. The cathode connections of the triode 66 are similar to those of triode 14, FIGURE 1, and both automatic gain control and the gating pulse are applied to the terminal 46 of the input transformer secondary winding 16. Output of the first stage is taken from the anode 78 of pentode 67 to the primary winding of the second stage input transformer 79. The secondary winding 81 of this transformer is connected at one end to the control grid 82 of the second stage triode 83. The other end 84 of winding 81 is connected to conductor 86 for automatic gain control and application of the gating pulse.

The pulse repetition frequency generator 28 pulses the transmitter 11 and also applies a negative gating pulse to the cathode follower 34, resulting in a 15-volt pulse at the restorer diode 38. This diode has the same precautionary function as described in connection with FIGURE 1. The diode 38 is followed by a resistor 87 shunted by a capacitor 88. This resistor and capacitor are followed by a diode 89 in series with a capacitor 91 shunted by a resistor 92. The resistor 87, capacitor 88, diode 89, capacitor 91 and resistor 92 are employed in place of the resistor 39, Zener diode 41 and diode 42 of FIGURE 1, and perform approximately the same function of clamping the peak of the negative pulse at about −10 volts. The difference is that in FIGURE 7 the clamp is not fixed in potential, but its clamp potential varies slightly with the potential of the AGC bus. The function of resistor 87 is to provide resistance in which the clamp can generate a potential drop. The function of the capacitor 88 is to preserve the waveform of the applied gate, particularly of its leading and trailing edges.

The diode 89 is followed by an inductor-resistor combination 93 serving as a 30 mc.p.s. trap. This is followed by a diode 94 serving as a second restorer as a precaution against positive potential at junction 96. Capacitor 97 helps to remove the 30 mc.p.s. carrier signal.

The automatic gain control circuit 48 applies negative control potential through control bus 49′, resistor 51 and diode 52 to the junction 96 for automatic gain control of the first two amplifier stages. The circuit 48 also applies its negative control potential through control bus 49 to the other stages of the intermediate frequency amplifier. The capacitors 53 and 53′ having capacitances of .047 μfd. and .0047 μfd. tend to maintain the AGC potential constant at junction 101 and to prevent the gating potential changes from entering the AGC circuit 48.

The negative gating pulse and the AGC potential are applied from junction 96 through a 30 mc.p.s. trap 98 and conductor 44 to the grid return junction 46 of the first intermediate frequency amplifier stage. The negative gating pulse is additionally applied from junction 96 through a 30 mc.p.s. trap 99 and conductor 86 to the grid return junction 84 of the second intermediate amplifier stage.

In the operation of the circuit of FIGURE 7, the presence of capacitor 88 tends to cause the potential at junction 96 to rise above zero between gating pulses. Therefore the second restorer diode 94 is employed, in addition to the restorer diode 38, to guard against rise of the potential at junction 96 above ground level.

Figure 2:
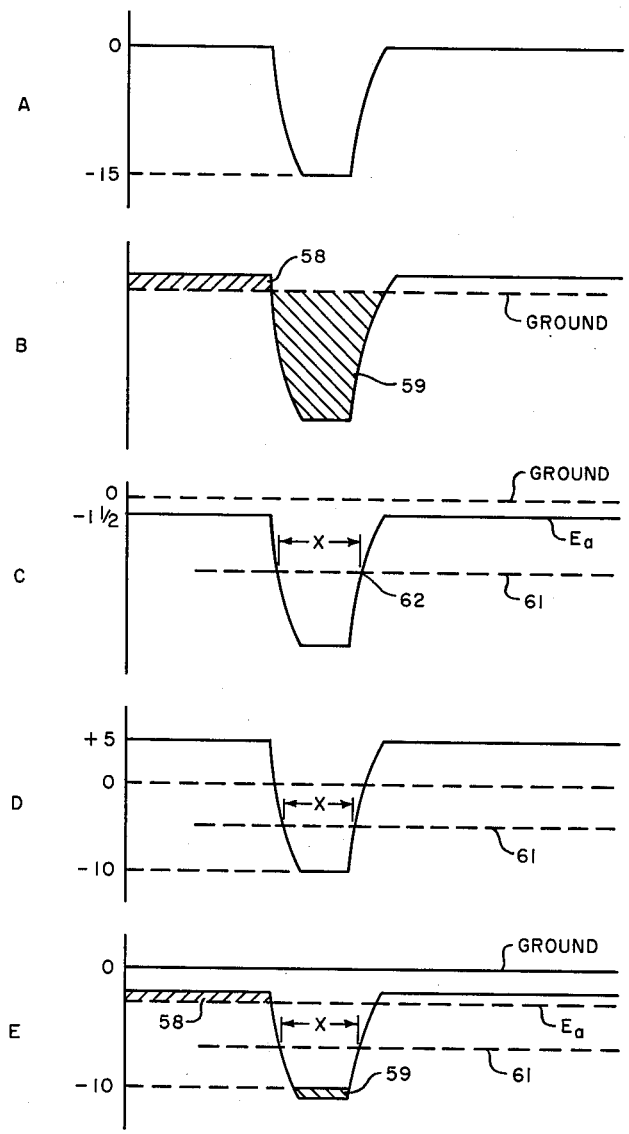
FIGURE 2 depicts graphs showing the operation of the invention.

The gating pulse applied to the unloaded junction 96 is as shown in graph A, FIGURE 2, and has, for example, a peak-to-peak potential of 15 volts. An equivalent circuit containing functioning parts is shown in FIGURE 8. Stray capacitance is indicated by the dashed capacitor 102.

Between pulses, when switch 56 is closed, capacitor terminal 57 rises in potential and, above the AGC potential of bus 49′, $E_a$, current flows through diode 52 into the AGC system. At all times when the potential of junction 96 is more negative than ground, which is generally the case both between pulses and during pulses, the diode 89 is conductive so that current can flow from capacitor 91 if it is not fully charged to the instant potential of junction 96. Capacitor 91 at all times discharges relatively slowly through resistor 92.

When the switch 56 is opened, at the beginning of the pulse the potential of the junction 96 drops and, when the potential is below that of $E_a$ and diode 52 becomes nonconductive, junction 96 potential drops at a rate determined by charge flowing into capacitor 37 from capacitors 91 and 97, with associated resistances. At the termination of the pulse, the potential of the junction 96 is caused to rise by electrostatic induction, the rate being again determined as before. Charges may now flow into capacitors 97 and 91 from capacitor 37, but current flow into capacitor 53/53′ through diode 52 will not occur until the potential of junction 96 has risen above $E_a$. Thus the pulse potential waveform at junction 96 will consist of several, perhaps three to six, approximately exponential branches. As in the example of FIGURE 1, however, the pulse will find a bottom at less than −15 volts because of current flow into the relatively large capacitor 91. This tends to raise the entire pulse waveform relative to ground. At the same time, the top of the waveform tends to be limited at or very near the AGC potential $E_a$. This tends to lower the entire pulse waveform relative to ground. Therefore the level of the pulse potential is the resultant of a number of factors, and is almost but not quite independent of the AGC potential. It follows that the pulse width, $x$, at the amplifier cutoff potential is also almost independent of the automatic gain control bus potential.

It has been found by test that increase of the negative AGC potential can be made to very slightly increase the pulse width, $x$, at the amplifier cutoff voltage level. It has also been found that this controllable increase has a beneficial effect in eliminating failures due to the slightly erratic pulse behaviors previously noted while still maintaining the minimum practicable pulse width.

What is claimed is:

1. A gating circuit for an amplifier stage comprising, a bias terminal in said amplifier stage having a potential referred to a datum potential, automatic gain control means having an output terminal, a unilaterally conducting element connecting said output terminal to said bias terminal, gating pulse generator means producing gating pulses, a capacitor periodically charged and discharged thereby and having a capacitor output terminal, means connecting said capacitor output terminal to said bias terminal for gating off said amplifier stage during the period of said gating pulses, and means connected to said bias terminal for limiting the potential thereof during the peaks of said gating pulses to a potential referred to said datum potential.

2. A gating circuit in accordance with claim 1 in which said means connected to the bias terminal for limiting the peak gating potential thereof includes a Zener diode having an avalanche potential referred to said datum value.

3. A gating circuit in accordance with claim 1 in which said means connected to the bias terminal for limiting the peak gating potential thereof includes a capacitor shunted by a resistor and both in series with a diode, said capacitor being connected to a terminal having said datum potential.

4. A gating circuit for an amplifier stage comprising, bias terminal means in said amplifier stage for controlling stage gain, said means having a potential referred to a datum potential, automatic gain control means having an output control terminal at an automatic gain control potential, a diode connected thereto poled for forward conduction of said automatic gain control potential and having a diode output terminal, means connecting said diode output terminal to said bias terminal means for automatic gain control of said amplifier stage, gating pulse generator means, a capacitor periodically charged and discharged thereby having a capacitor output terminal, means connecting said capacitor output terminal to said bias terminal means for periodically gating off said amplifier stage during the gating pulses emited by said gating pulse generator, and potential limiting means connected to said bias terminal for limiting the potential thereof during the peaks of pulses emitted by said gating pulse generator to a value referred to said datum potential.

5. A gating circuit for an amplifier stage comprising, bias terminal means in said amplifier stage for controlling stage gain, said means having a potential referred to a datum potential, automatic gain control means having an output control terminal at an automatic gain control potential, a diode connected thereto for forward conduction of said automatic gain control potential and having a diode output terminal, means connecting said diode output terminal to said bias terminal means for automatic gain control of said amplifier stage, pulse generator means generating gating pulses, a capacitor periodically charged and discharged thereby and having a capacitor output terminal, means connecting said capacitor output terminal to said bias terminal means for periodically gating off said amplifier stage during said gating pulses, a Zener diode having one terminal at said datum potential and being poled for avalanche breakdown in the direction away from said datum potential terminal, and a second diode connected in series with said Zener diode poled for forward conduction in a direction opposite to said Zener diode, said second diode being connected between said bias terminal means and said Zener diode.

6. A gating circuit for an amplifier stage comprising, bias terminal means in said amplifier stage for controlling datum potential, automatic gain control means having an output control terminal at an automatic gain control postage gain, said means having a potential referred to a tential, a diode connected thereto for forward conduction of said automatic gain control potential and having a diode output terminal, means connecting said diode output terminal to said bias terminal means for automatic gain control of said amplifier stage, pulse generator means generating gating pulses, a capacitor periodically charged and discharged thereby and having a capacitor output terminal, means connecting said capacitor output terminal to said bias terminal means for periodically gating off said amplifier stage during said gating pulses, a second capacitor, a resistor in shunt therewith, a second diode in series with the combination of said second capacitor and resistor, said second diode second capacitor and resistor forming a two-terminal unit having one terminal at said datum potential, the other terminal of said two-terminal unit being connected to said bias terminal means.

References Cited in the file of this patent
UNITED STATES PATENTS

| | | |
|---|---|---|
| 2,561,059 | Corrington | July 17, 1951 |
| 2,685,620 | Nixon | Aug. 3, 1954 |
| 2,976,462 | Miller | Mar. 21, 1961 |